No. 652,083. Patented June 19, 1900.
C. W. CHRISTMAN.
PHOTOGRAPHIC VIGNETTER.
(Application filed Feb. 3, 1900.)

(No Model.) 2 Sheets—Sheet 1.

WITNESSES:
Edward Thorpe
J. B. Owens

INVENTOR
Charles W. Christman
BY
ATTORNEYS

No. 652,083. Patented June 19, 1900.
C. W. CHRISTMAN.
PHOTOGRAPHIC VIGNETTER.
(Application filed Feb. 3, 1900.)
(No Model.) 2 Sheets—Sheet 2.
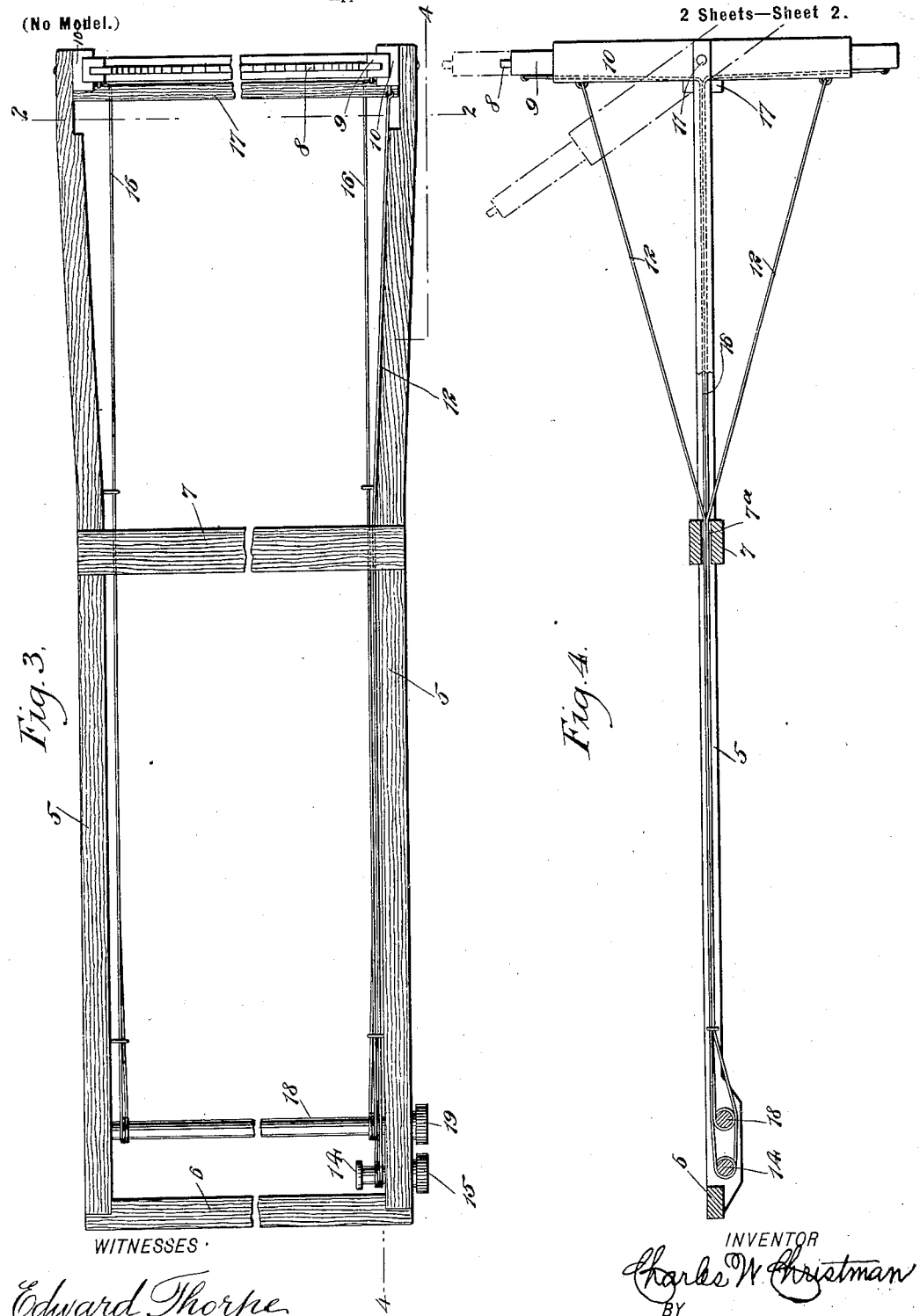
WITNESSES
Edward Thorpe
INVENTOR
Charles W. Christman
BY
ATTORNEYS

UNITED STATES PATENT OFFICE.

CHARLES W. CHRISTMAN, OF WATERVILLE, MINNESOTA.

PHOTOGRAPHIC VIGNETTER.

SPECIFICATION forming part of Letters Patent No. 652,083, dated June 19, 1900.

Application filed February 3, 1900. Serial No. 3,820. (No model.)

*To all whom it may concern:*

Be it known that I, CHARLES W. CHRISTMAN, a citizen of the United States, and a resident of Waterville, in the county of Le Sueur and State of Minnesota, have invented a new and Improved Vignetter, of which the following is a full, clear, and exact description.

The purpose of this invention is to provide a device facilitating the production of vignettes, which device will be more completely under the control of the photographer than those previously produced.

This specification is the disclosure of one form of the invention, while the claim defines the actual scope thereof.

Reference is to be had to the accompanying drawings, forming a part of this specification, in which similar characters of reference indicate corresponding parts in all the views.

Figure 1:
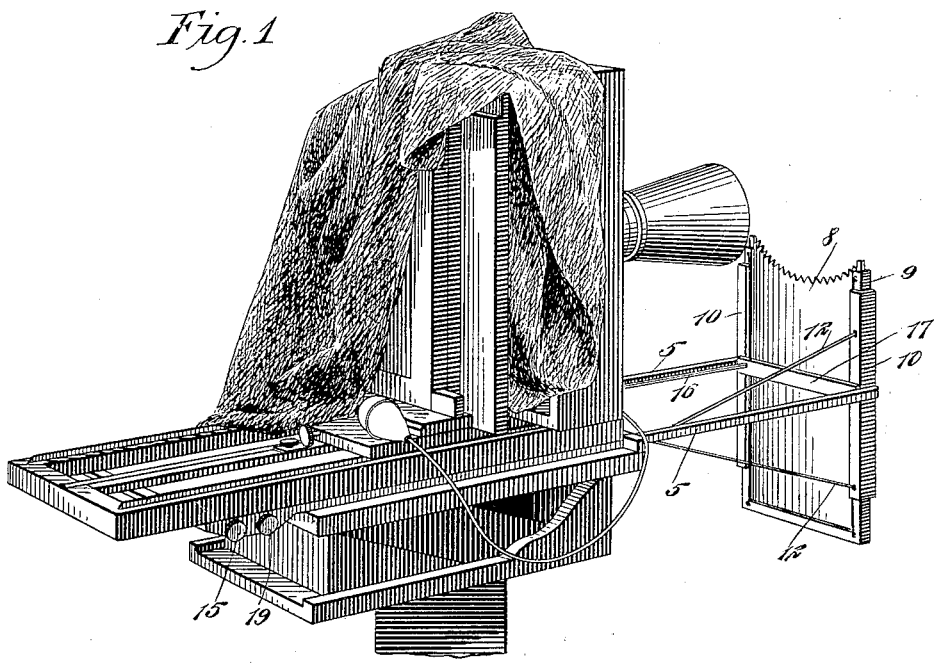
Figure 2:
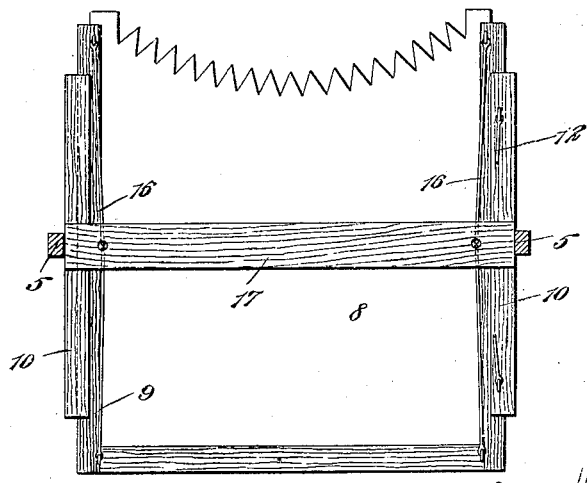

Figure 1 is a perspective view showing the invention in use. Fig. 2 is a sectional view on the line 2 2 of Fig. 3. Fig. 3 is a plan view of the invention, and Fig. 4 is a section on the line 4 4 of Fig. 3.

The invention comprises a rigid elongated frame formed of two side bars 5, the rear ends of which are joined by a cross-bar 6 and intermediate portions of which are joined by a cross-bar 7. This frame is adapted to be placed on the camera-table and beneath the camera, as illustrated in Fig. 1, so as to be held in place by the weight of the camera, as shown.

A screen 8 of suitable form is carried in a three-sided frame 9, such frame having its side portions sliding, respectively, in channel-bars 10, and these channel-bars are respectively pivoted to the front ends of the side portions 5 of the frame by means of pins 11. (Best illustrated in Fig. 4.) It will thus be seen that the screen is carried so that it may be adjusted about the axes of the pivots 11 and also adjusted edgewise longitudinally of the channel-bars 10, which movements are indicated by dotted lines in Fig. 4. For the purpose of adjusting the channel-bars 10 on their pivots 11, and consequently adjusting the screen 8, I provide two cords 12 or flexible connections of any sort, which are fastened to one of the channel-bars respectively at opposite sides of the pivot, and which are led rearward through an opening $7^a$ in the cross-bar 7 and thence to a winding-spindle 14, mounted in the rear portion of the frame and fitted with a thumb-wheel 15, facilitating the turning of the spindle. The cords 12 being wound oppositely on the spindle 14, when the spindle is turned one cord will be drawn in and the other let out, and thus the channel-bar to which the cords 12 are attached is moved, and through the medium of the frame 9 the other channel-bar is moved in time with the first-named bar. For the purpose of sliding the frame 9 with the screen 8 relatively of the channel-bars 10 I provide two pairs of cords 16, such pairs of cords being respectively located at the sides of the frame of the device and being passed through openings in a transverse bar 17, fastened to and extending between the channel-bars 10. From this bar 17 the cords 16 pass rearward around a spindle 18, mounted adjacent to and parallel with the spindle 14, the spindle 18 extending from one side bar 5 to the other. This spindle is fitted with a thumb-wheel 19, situated adjacent to the spindle 18 to facilitate turning the first-named spindle. The cords 16 are wound oppositely on the spindle 18, and when this spindle is turned the frame 9 is slid on the channel-bars 10, as explained.

As shown in Fig. 1, the photographer may stand behind the instrument, as usual, and by manipulating the wheels 15 and 19 the vignette-screen may be readily adjusted to suit the picture which he desires to take, and it will also be seen that owing to the manner in which the screen is mounted it may be moved to a great number of positions, all of which may be utilized to advantage by the photographer.

Having thus described my invention, I claim as new and desire to secure by Letters Patent—

A vignetter, comprising a frame formed of side bars rigidly connected by cross-bars, channel-bars pivotally mounted respectively at the inner sides of the side bars of the frame, a transverse bar extending between the channel-bars and joined thereto to connect the channel-bars with each other, a screen mounted to slide in the channel-bars and to swing therewith, the screen extending between the channel-bars and transversely of the frame, means for swinging the channel-bars on the side bars of the frame, and additional means for sliding the screen in the channel-bars independently of the swinging thereof.

In testimony whereof I have signed my name to this specification in the presence of two subscribing witnesses.

CHARLES W. CHRISTMAN.

Witnesses:
E. I. CHRISTMAN,
M. R. EVERETT.